(12) United States Patent  (10) Patent No.: US 7,581,290 B2
Chang  (45) Date of Patent: Sep. 1, 2009

(54) HINGE STRUCTURE

(75) Inventor: Jui-Hung Chang, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 0 days.

(21) Appl. No.: 12/126,966

(22) Filed: May 26, 2008

(65) Prior Publication Data
US 2009/0064459 A1    Mar. 12, 2009

(30) Foreign Application Priority Data
Sep. 7, 2007    (TW) .............................. 96215004 U

(51) Int. Cl.
*E05C 17/64*    (2006.01)
(52) U.S. Cl. .............................. 16/340; 16/342; 16/330; 16/303
(58) Field of Classification Search .................. 16/340, 16/330, 338–342, 303; 361/680–683, 679.27; 248/919–923; 379/433.13; 455/575.3
See application file for complete search history.

(56) References Cited

U.S. PATENT DOCUMENTS

| 5,632,066 | A  | * | 5/1997  | Huong    | 16/338 |
| 5,970,819 | A  | * | 10/1999 | Katoh    | 74/531 |
| 6,154,925 | A  | * | 12/2000 | Miura    | 16/338 |
| 6,584,646 | B2 | * | 7/2003  | Fujita   | 16/342 |
| 6,757,940 | B2 | * | 7/2004  | Lu et al.| 16/330 |
| 6,779,234 | B1 | * | 8/2004  | Lu et al.| 16/340 |
| 6,862,779 | B1 | * | 3/2005  | Lu et al.| 16/340 |
| 6,983,514 | B2 | * | 1/2006  | Lu et al.| 16/342 |
| 7,082,642 | B2 | * | 8/2006  | Su       | 16/340 |
| 7,222,396 | B2 | * | 5/2007  | Lu et al.| 16/340 |

* cited by examiner

*Primary Examiner*—William L. Miller
(74) *Attorney, Agent, or Firm*—Guice Patents PLLC

(57) ABSTRACT

The present invention discloses a hinge structure, comprising a pivot having a linking portion disposed with a circular axle axially and a smaller axle extending from the center of the front end of the shaft; a main frame having a connection portion which is formed axially to have a bush-like tube spring below for the insertion of the shaft, the tube spring being positioned to have a gap with the connection portion and one end of the wall of the tube spring being formed to have an notch; a cam member having a rotation part and fixed part between which is disposed with concurrent protruded and indented portions and which are installed inside the tube spring for the insertion of the axle, the rotation part being axially disposed with a protruded tenon, which is connected with the notch of the tube spring, and the fixed part being secured with the axle; and at least a resilient member insertingly connected with the axle and secured with the connection segment of the axle by an end enclosure, which presses and constrains the aforementioned parts.

7 Claims, 4 Drawing Sheets

HINGE STRUCTURE

FIELD OF THE INVENTION

The present invention relates to a hinge structure and in particular to a variable-torque hinge structure with auto-locking and easy opening-firm closing functions.

BACKGROUND OF THE INVENTION

Consumer electronics with flip covers, such as portable computer, electronic dictionary, portable audio/video player, flip mobile phone, generally have a main body on the bottom, which is pivotally connected with the cover to body on the top, such that the cover body may swing open or close with respect to the main body. Consequently, the rotating axle is key to the quality of the products described above.

To prevent the main body and the cover of the 3C electronic products described above from swinging open arbitrarily, at least a sliding or pressing switch is provided at the respective limit of the movement angle such that the switch may be used to fold them together to close down during swinging close. However for this type of automatic locking mechanism, the rotating shaft structure with automatic locking mechanism has to be provided with corresponding holes and locking elements, leading to an increase in the complexity for assembly and the manufacturing cost. It is therefore necessary to provide a new design to overcome the drawbacks described above.

Consequently, to provide the cover body with an auto-locking function with respect to the main body, it is a conventional approach to dispose a cam member in the hinge structure, such that the protruded portion of a rotation member of the cam member is engaged into an indented portion to mate together and thus to achieve the desired auto-locking function. Therefore, when the cover is being flipped open through the cam member, a user has to provide a force to render the protruded portion to move out the indented portion, thereby achieving a hinge structure with the "easy opening and firm closing" function. It is not a user-friendly design because a rather large force has to be exerted to flip open the cover body. As a result, the flipping opening motion usually requires the user to press down the main body with the other hand; otherwise, the main body will be lift upward along with the cover body, thereby causing inconvenience. Therefore it is an urgent task to provide a variable torque mechanism with "easy opening and firm closing" characteristic when the cover body is being opening up with respective to the main body.

SUMMARY OF THE INVENTION

In view of the foregoing shortcomings of the prior art, the inventor of the present invention based on years of experience in the related industry hopes to improve the user-unfriendly design of "easy opening and firm closing" for conventional auto-locking hinge structure. The aim is to include a variable torque mechanism to a hinge structure and thereby when the hinge structure according is being flipped open, the torque required for "firm opening and easy closing" is dispersed and thus a small force is sufficient to flip open the cover without lifting up the main body. After numerous experiments and tests, a hinge structure according to the present invention has been achieved.

In order to accomplish the object described above, the present invention is to provide a hinge structure, comprising a pivot having a linking portion disposed with a circular axle axially and a smaller axle extending from the center of the front end of the shaft; a main frame having a connection portion which is formed axially to have a bush-like tube spring below for the insertion of the shaft, the tube spring being positioned to have a gap with the connection portion and one end of the wall of the tube spring being formed to have an notch; a cam member having a rotation part and fixed part between which is disposed with concurrent protruded and indented portions and which are installed inside the tube spring for the insertion of the axle, the rotation part being axially disposed with a protruded tenon, which is connected with the notch of the tube spring, and the fixed part being secured with the axle; and at least a resilient member insertingly connected with the axle and secured with the connection segment of the axle by an end enclosure, which presses and constrains the aforementioned parts.

Another object of the present invention is to provide a hinge structure, wherein the linking portion of the pivot is formed to have at least a linking hole and the connection portion of the main frame is formed to have at least a connection hole.

Yet another of the present invention is to provide a hinge structure, wherein the connection portion extends to form a linking plate from whose end a bush-like tube spring is formed thereon and a gap is maintained between the tube spring and the linking plate.

Still yet another object of the present invention is to provide a hinge structure, wherein concurrent protruded portions and indented portions are alternately disposed at the inner and outer brim edges of the connecting surfaces of the rotation part and the fixed part and are engaged together.

Still another object of the present invention is to provide a hinge structure, wherein the resilient member is a disc spring, wave spring or spring.

Still yet another object of the present invention is to provide a hinge structure, wherein a spacer is disposed between the end enclosure and resilient member and is formed on its surface to have a multiple of oil holes to receive lubricating oil.

Still yet another object of the present invention is to provide a hinge structure, wherein a stop rim is protrudingly disposed at the wall of one end of the tube spring and a fan-shape limit stop is protrudingly disposed at the rear end of the shaft, such that the two ends of the stop rim and the limit stop can limit the angle of opening and closing movement.

The present invention can be more fully understood by reference to the following description and accompanying drawings, in which: FIG. 1 is an exploded perspective view of a hinge structure of the present invention; FIG. 2 is an exploded perspective view of a hinge structure of the present invention from another view angle; FIG. 3 is a cross-section view of a hinge structure of the present invention; and FIG. 4 is a perspective assembly view of a hinge structure of the present invention.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
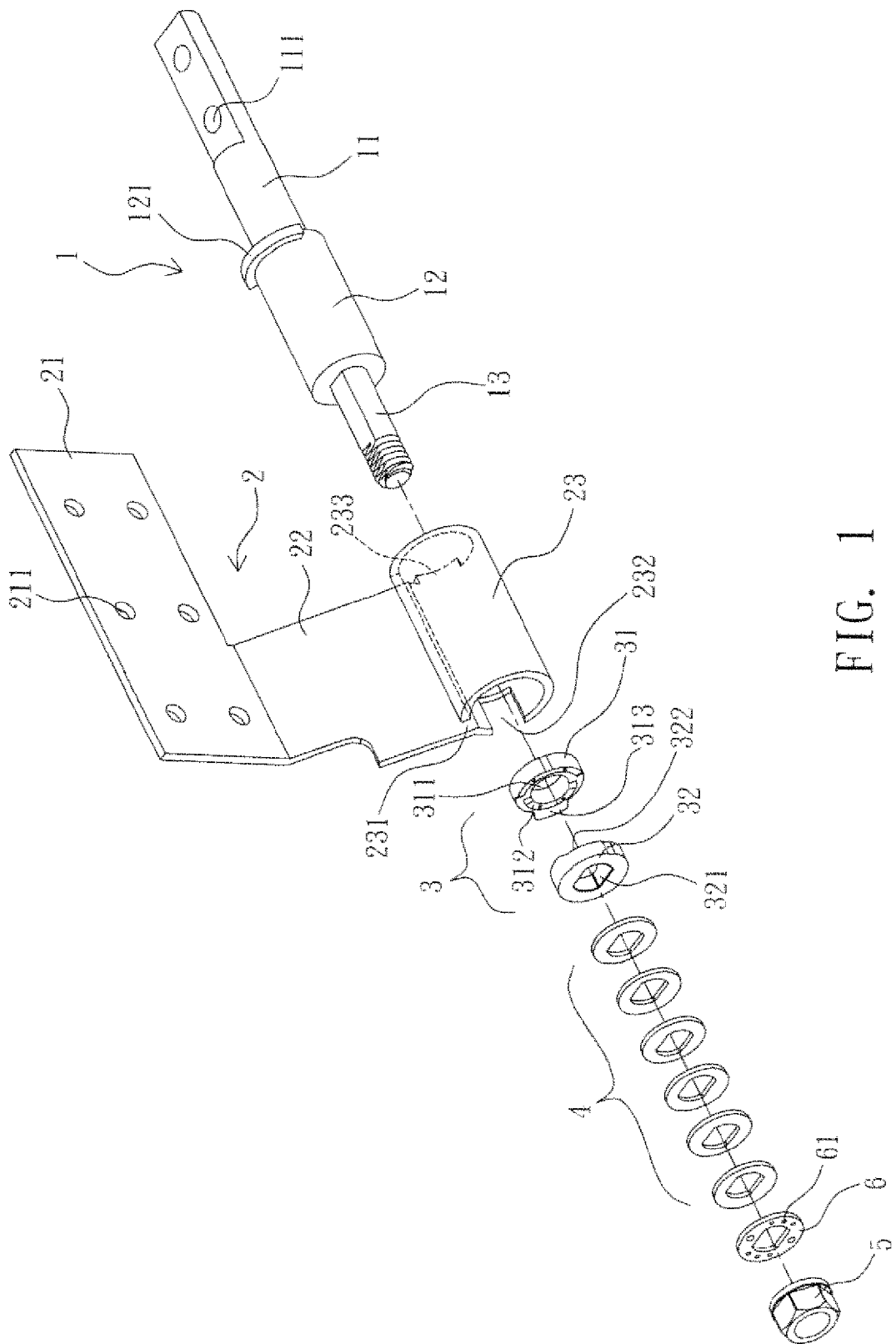
FIG. 1 is an exploded perspective view of a hinge structure of the present invention.
Figure 2:
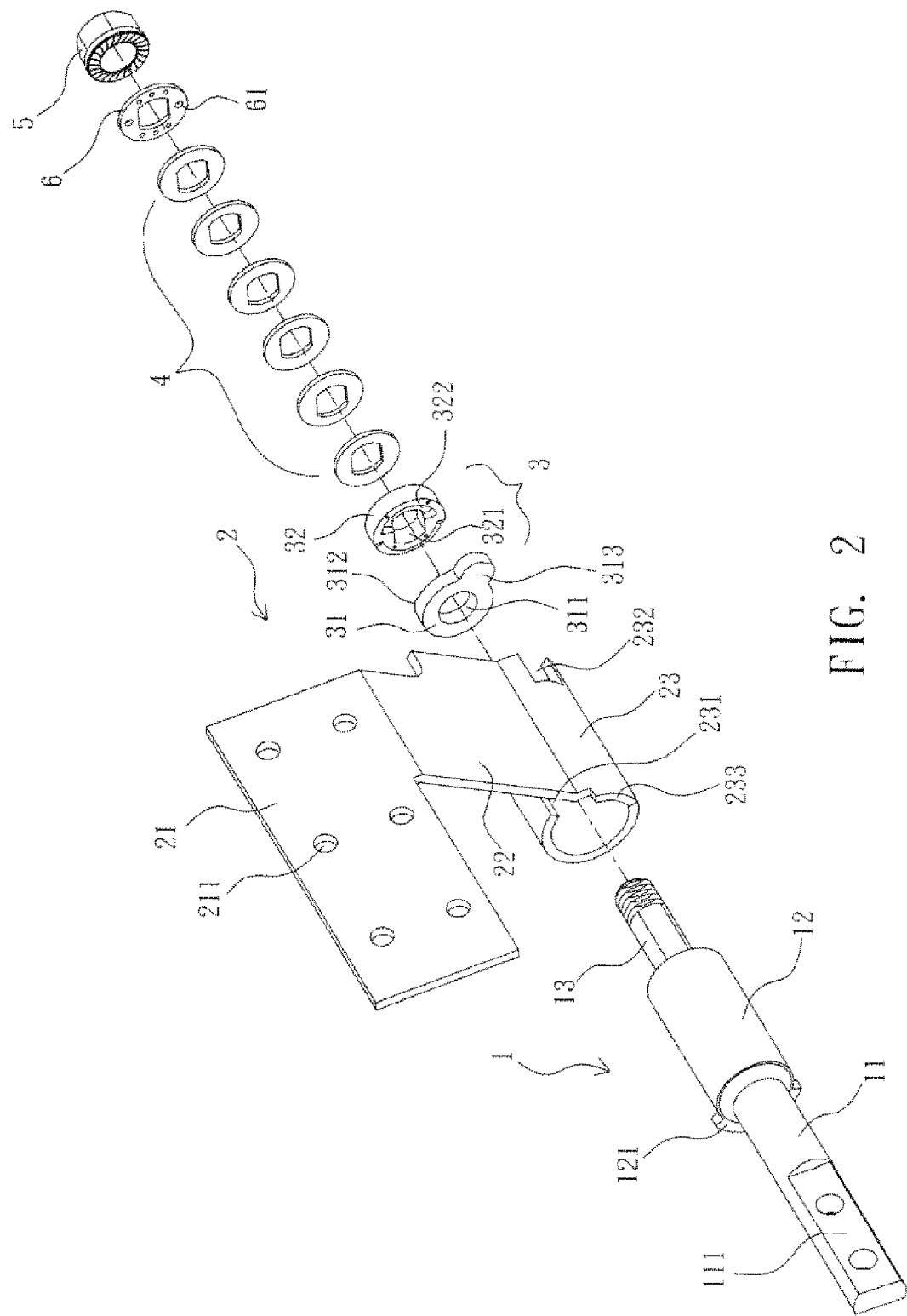
FIG. 2 is an exploded perspective view of a hinge structure of the present invention from another view angle.

With reference to FIGS. 1 to 4, a hinge structure according to the present invention comprises a pivot 1, a main frame 2, a cam member 3, and at least a resilient member 4.

The pivot 1 is a multi-step shaft disposed with a linking portion 11 formed to have at least a linking hole 111 to be connected with an object, for example but not limited to the main body of a notebook computer. The linking portion 11 when implemented can be a mill-face prism or a polyhedron so as to be directly inserted into the main body. The pivot 1 according to the present invention is characterized by that it is axially disposed with a circular shaft 12 which is extending to form a smaller axle 13 from its center of the front end.

The main frame 2 is a frame formed by bending, having on its one side a connection portion 21 which is formed to have at least a connection hole 211 to be connected with an object, for example but not limited to the main body of a notebook computer. The connection portion 21 extends to form a linking plate 22 from whose end a bush-like tube spring 23 is formed thereon. Between the tube spring 23 and the linking plate 22 lies a gap 231 which provides a radially resilience for the insertion of the shaft 12 so as to exert a friction torque. Further, to secure the rotation part 31 of the cam member 3, the wall of the front end of the tube spring 23 is formed to have a notch.

The cam member 3 is received in the tube spring 23 and comprises a rotation part 31 and a fixed part 32 between which is disposed with a concurrent interference structure; for example, the inner and outer brim edges of two connecting surfaces are concurrently disposed with alternate interference structures, respectively, which are then engaged together. The rotation part 31 and fixed part 32 are to formed to an axial hole 311 and a through hole 321, respectively, for the insertion of the axle 13 and for firmly securing the fixed part 32 and the axle 13. Further, the inner and outer brim edges of the connecting surfaces of the rotation part 31 and the fixed part 32 are alternately formed to have a protruded portion 312 and indented portion 322, respectively, which are engaged in an un-activated status. The rotation part 31 is radially disposed with a protruded tenon 313, which is inserted into the notch 232 of the tube spring 23 so as to move integratedly and also rotate synchronously with the main frame 2.

The resilient member 4 is insertingly connected with the axle 13 so as to render the fixed part 32 moving axially on the axle 13. When implemented, the resilient member 4, as shown in the figures, is, for example but not limited to, disc springs. The resilient member 4 can also be wave springs or springs when implemented.

The end enclosure 5 is connected onto the connection segment of the axle 13 and in turn is pressed against as well as constrains the aforementioned parts to prevent them from coming loose out of the axle 13. The end enclosure 5 when implemented is a self-locking nut, and to provide a preferred pressing and lubricating effects, a spacer 6 is disposed between the end enclosure 5 and resilient member 4 and is formed on its surface to have a multiple of oil holes 61 to receive lubricating oil, which provides lubrication for the end enclosure 5 and resilient member 4.

Further, to obtain the starting and finishing points on rotating limits of the main frame 2, a stop rim 233 is protrudingly disposed at the wall of one end of the tube spring 23 and a fan-shape limit stop 121 is protrudingly disposed at the rear end of the shaft 12, such that the two ends of the stop rim 223 and the limit stop 121 can limit the angle of opening and closing movement.

Figure 3:
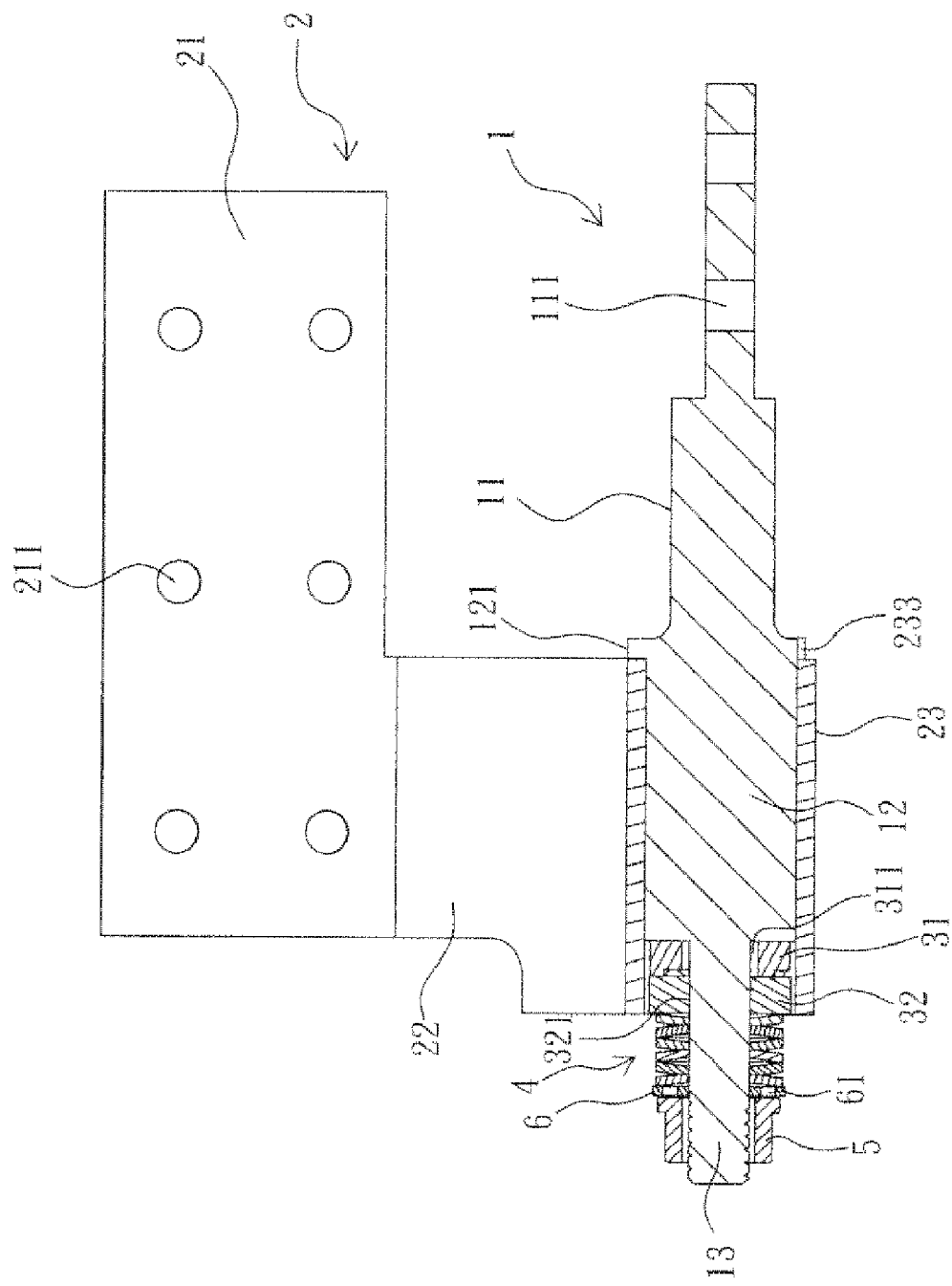
FIG. 3 is a cross-section view of a hinge structure of the present invention.
Figure 4:
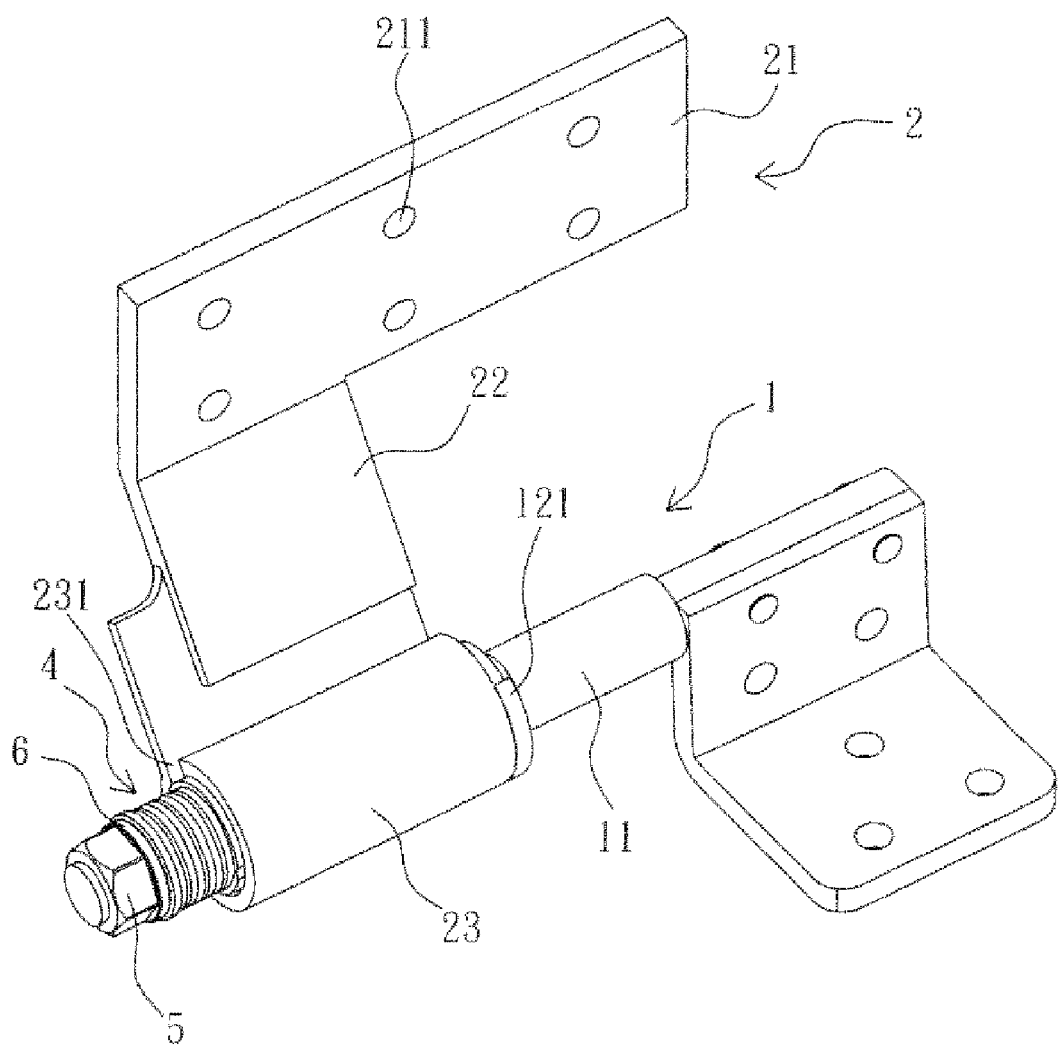
FIG. 4 is a perspective assembly view of a hinge structure of the present invention.

With reference to FIGS. 1 to 4, with the descriptions for the relationship of aforementioned parts and their assembled configuration, the sectional assembly view and perspective assembly view are shown in FIGS. 3 and 4, respectively, in which the shaft 12 is socketingly inserted into the tube spring 23 and the shaft 12 in the tube spring 23 is pivoted to the cam member 3 comprising the rotating part 31 and the fixed part 32.

Upon implementation, when the cover body is being closed inward, the main body 2 is synchronously rotated. In the mean time, the protruded portions 312 of the rotation part 31 rotate along the contacting surface of the fixed part 32 and radially press against the resilient member 4; when the protruded portions 312 of the rotation par 31 reach the indented portion 322 of the fixed part 32, the extension of the resilient member 4 pushes the protruded portions 312 into engaging with the indented portions 322, thereby achieving the auto-locking status. During the auto-locking process, the tube spring 23 rotates with respect to the shaft 12. Since the tube spring 23 is in one-direction encircling the shaft 12 and thereby exhibits a variable torque to induce interaction therebetween and to disperse torque. As a result, when the hinge structure according to the present invention is being flipped open, the torque required is dispersed by the tube spring 23 and shaft 12; thus a small force is sufficient to flip open the cover without lifting up the main body.

With the implementation of the present invention, apart from the expected auto-locking function, the hinge structure is additionally provided with a variable torque mechanism of "easy opening and firm closing," which can facilitate the opening of the cover body by dispersing the torque required for opening the cover body and thus the main body will be lift up when the cover being opened. The present invention is definitely a novel breakthrough of the similar hinge structure.

While the invention has been described with reference to the a preferred embodiment thereof, it is to be understood that modifications or variations may be easily made without departing from the spirit of this invention, which is defined by the appended claims.

What is claimed is:

1. A hinge structure, comprising
  a pivot having a linking portion disposed with a circular shaft axially and a smaller axle extending from a center of a front end of the circular shaft;
  a main frame having a connection portion which is formed axially to have a tube spring below for the insertion of the circular shaft, the tube spring being positioned to have a gap with the connection portion and a first end of a wall of the tube spring being formed to have an notch;
  a cam member having a rotation part and fixed part, the rotation part has a protruded portion and the fixed part has an indented portion, the protruded portion and the indented portion are located between the rotation part and the fixed part, the rotation part and the fixed part are installed inside the tube spring for the insertion of the smaller axle, the rotation part being axially disposed with a protruded tenon, which is connected with the notch of the tube spring, and the fixed part being secured with the smaller axle; and
  at least one resilient member insertingly connected with the smaller axle and secured with a connection segment of the smaller axle by an end enclosure, which presses and constrains the cam member and the at least one resilient member.

2. The hinge structure according to claim 1, wherein the linking portion of the pivot is formed to have at least a linking hole and the connection portion of the main frame is formed to have at least a connection hole.

3. The hinge structure according to claim 1, wherein the connection portion extends to form a linking plate from whose end the tube spring is formed thereon and the gap is maintained between the tube spring and the linking plate.

4. The hinge structure according to claim 1, wherein concurrent protruded portions and indented portions are alternately disposed at the inner and outer brim edges of connecting surfaces of the rotation part and the fixed part, and are engaged together.

5. The hinge structure according to claim 1, wherein the at least one resilient member is selected from a group consisting of a disc spring, wave spring and spring.

6. The hinge structure according to claim 1, wherein a spacer is disposed between the end enclosure and resilient member and is formed on its surface to have a multiple of oil holes to receive lubricating oil.

7. The hinge structure according to claim 1, wherein a stop rim is protrudingly disposed at a second end of the wall of the tube spring and a fan-shape limit stop is protrudingly disposed at the rear end of the shaft, such that the two ends of the stop rim and the limit stop can limit the angle of opening and closing movement.

* * * * *